United States Patent
Yoo et al.

(10) Patent No.: US 11,721,820 B2
(45) Date of Patent: Aug. 8, 2023

(54) APPARATUS AND METHOD FOR MEASURING CELL PITCH OF FUEL CELL STACK

(71) Applicants: Hyundai Motor Company, Seoul (KR); Kia Corporation, Seoul (KR)

(72) Inventors: Jin Hyeok Yoo, Cheonan-si (KR); Byeong-Heon Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/239,901

(22) Filed: Apr. 26, 2021

(65) Prior Publication Data

US 2022/0140370 A1    May 5, 2022

(30) Foreign Application Priority Data

Nov. 4, 2020  (KR) .................. 10-2020-0146022

(51) Int. Cl.
*H01M 8/04664* (2016.01)
*G01N 27/72* (2006.01)

(52) U.S. Cl.
CPC ........ *H01M 8/04679* (2013.01); *G01N 27/72* (2013.01)

(58) Field of Classification Search
None
See application file for complete search history.

(56) References Cited

U.S. PATENT DOCUMENTS

| | | | |
|---|---|---|---|
| 2008/0042654 A1* | 2/2008 | Kato | H01M 8/2483 324/228 |
| 2009/0068506 A1* | 3/2009 | Tomura | H01M 8/04552 429/431 |
| 2014/0197818 A1 | 7/2014 | Stanley | |
| 2017/0092977 A1* | 3/2017 | Lee | H01M 8/248 |
| 2018/0032173 A1 | 2/2018 | Kim et al. | |

FOREIGN PATENT DOCUMENTS

| | | |
|---|---|---|
| KR | 101402331 B1 | 6/2014 |
| KR | 101618286 B1 | 5/2016 |
| KR | 102030857 B1 | 10/2019 |

OTHER PUBLICATIONS

Osada Takahito et al.; Assembling System and Assembling Method for Fuel Cell, and Fuel Cell Assembled by the Same Assembly Method; Date Published Jan. 15, 2009; JP 2009009912 A; CPC Y 02 E 60/50 (Year: 2009).*

* cited by examiner

*Primary Examiner* — Nasima Monsur
(74) *Attorney, Agent, or Firm* — Slater Matsil, LLP (57) ABSTRACT

An apparatus for measuring a cell pitch of a fuel cell stack, the fuel cell stack including a plurality of unit cells stacked in a stacking direction, wherein each unit cell has a membrane electrode assembly (MEA) interposed between a pair of metal separators, is provided. The apparatus includes a detector configured to generate a magnetic field in response to application of a current while being moved along the stacking direction of the unit cells, and sense an induced current generated in the separators by the generated magnetic field to detect positions of the separators.

13 Claims, 5 Drawing Sheets

FIG. 5

APPARATUS AND METHOD FOR MEASURING CELL PITCH OF FUEL CELL STACK

CROSS-REFERENCE TO RELATED APPLICATIONS

This application claims the benefit of Korean Patent Application No. 10-2020-0146022, filed Nov. 4, 2020, which application is hereby incorporated herein by reference.

TECHNICAL FIELD

The present invention relates generally to an apparatus and a method for measuring a cell pitch of a fuel cell stack.

BACKGROUND

A fuel cell is a type of power generator that converts chemical energy of fuel into electric energy through an electrochemical reaction in a stack. Fuel cells have a wide range of applications, including serving as industrial power generators, serving as household power generators, powering vehicles, and powering small electronic devices such as portable devices. In recent years, fuel cells have increasingly been used as high efficiency clean energy sources.

In a unit cell of a typical fuel cell stack, a membrane electrode assembly (MEA) is located at the innermost portion of the cell. The MEA includes a polymer electrolyte membrane (PEM) allowing transport of positively charged hydrogen ions (protons) therethrough, and catalyst layers, that is, an anode and a cathode, applied on opposite surfaces of the PEM to cause hydrogen and oxygen to react.

Furthermore, a pair of gas diffusion layers (GDLs) are laminated outside of the MEA where the anode and the cathode are located, and a pair of separators each having a flow field for supplying fuel and discharging water generated by reactions in the MEA are respectively located outside of the GDLs with gaskets interposed therebetween. End plates are assembled to the outermost portion of the fuel cell stack to structurally support and secure individual components described above in position.

Meanwhile, recently, an integrated frame in which a gasket and an insert formed by joining a GDL to an MEA are integrated has been proposed.

Furthermore, recently, an elastomeric cell frame for a fuel cell in which the elastomeric cell frame is integrally joined to an MEA, a GDL, and a separator by using a sheet-type elastomeric frame made of a thermoplastic elastomer (TPE) without requiring use of a separate adhesive member has been proposed.

All the various types of fuel cell stacks as described above require a uniform surface pressure applied to a reaction zone and a sealing line of each unit cell for stable electricity generation performance and sealing performance.

However, since the fuel cell stack is composed of hundreds of membrane electrode assemblies, gas diffusion layers, and separators, a case in which compaction pressure is concentrated to any one unit cell may occur. In this case, the unit cell where the pressure is concentrated has a cell pitch lower than a reference value. As a result, in this unit cell, problems such as deterioration of water discharging property of a reaction zone, gas supply property, and durability of a gasket may occur.

Meanwhile, in the related art, in order to measure the pitch of a unit cell, the total length of a fuel cell stack is measured, and the measured value is divided by the number of unit cells to calculate the pitch of the unit cell. However, this method can only obtain an average pitch value of all the unit cells, but cannot calculate the pitch of each unit cell. Therefore, predicting where a defective unit cell would occur is impossible.

The foregoing is intended merely to aid in the understanding of the background of the present invention, and is not intended to mean that the present invention falls within the purview of the related art that is already known to those skilled in the art.

SUMMARY

The present invention relates generally to an apparatus and a method for measuring a cell pitch of a fuel cell stack. Particular embodiments relate to an apparatus and a method for measuring a cell pitch of a fuel cell stack, the apparatus and method being capable of measuring the pitch of each unit cell using an electromagnetic induction method.

Accordingly, embodiments of the present invention have been made keeping in mind problems occurring in the related art, and an embodiment of the present invention provides an apparatus and a method for measuring a cell pitch of a fuel cell stack, the apparatus and method being capable of measuring the pitch of each unit cell using an electromagnetic induction method.

According to one embodiment of the present invention, there is provided an apparatus for measuring a cell pitch of a fuel cell stack, the apparatus for measuring a unit cell pitch of the fuel cell stack configured by stacking a plurality of unit cells each having a pair of metal separators and a membrane electrode assembly (MEA) interposed therebetween, and includes a detection unit generating a magnetic field in response to application of current while being moved along a stacking direction of the unit cells, and sensing an induced current generated in the separators by the generated magnetic field to detect positions of the separators.

The apparatus may further include a moving means maintaining a moving speed of the detection unit at a constant speed.

The moving means may include a support composed of an upper support supported on an upper end of the fuel cell stack and a lower support supported on a lower end of the fuel cell stack, and a vertical guide bar installed between the upper support and the lower support along the stacking direction of the unit cells, and the detection unit may be moved along the vertical guide bar.

The moving means may further include a rail block provided between the upper support and the lower support, an upper slide coupled to the upper support to slide integrally with the upper support along the rail block, a lower slide coupled to the lower support to slide integrally with the lower support along the rail block, and an elastic member provided between the rail block and each of the upper support and the lower support to provide a restoring force to bias the upper support and the lower support in directions toward the rail block.

The moving means may further include an upper horizontal guide bar having opposite ends installed at opposite ends of the upper support, an upper moving block coupled to an upper end of the vertical guide bar to be moved in a horizontal direction along the upper horizontal guide bar, a lower horizontal guide bar having opposite ends installed at opposite ends of the lower support, and a lower moving block coupled to a lower end of the vertical guide bar to be moved in the horizontal direction along the lower horizontal guide bar.

The detection unit may include a magnetic field generator generating the magnetic field in response to application of power, and an induced current detector detecting the induced current generated in the separators by the magnetic field generated by the magnetic field generator.

When the induced current is generated in the separators by the magnetic field oscillated by the magnetic field generator and a reverse magnetic field is generated thereby, the induced current detector may detect a change in intensity of the current changed by the reverse magnetic field.

Meanwhile, according to another embodiment of the present invention, there is provided a method of measuring a unit cell pitch of a fuel cell stack configured by stacking a plurality of unit cells each having a pair of metal separators and an MEA interposed therebetween, the method including preparing a detection unit that generates a magnetic field in response to application of power and measures a changed current value, oscillating, in a direction of the fuel cell stack, the magnetic field generated while the prepared detection unit is moved along a stacking direction of the unit cells, and sensing an induced current generated in the separators by the oscillated magnetic field to detect positions of the separators.

In the oscillating of the magnetic field, a moving speed of the detection unit may be maintained at a constant speed.

The detecting of the positions of the separators may be performed by, when the induced current is generated in the separators by the oscillated magnetic field and a reverse magnetic field is generated thereby, detecting a change in intensity of the current changed by the reverse magnetic field to thereby determine the positions of the separators.

According to the embodiments of the present invention, it is possible to directly measure the pitch of each unit cell constituting the fuel cell stack, thereby obtaining an effect of efficiently managing the quality and airtight performance of the fuel cell stack.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings. However, the present invention is not limited to the following embodiments and may be implemented in various ways different from one another, and the exemplary embodiments are provided to complete the present invention and to completely inform those skilled in art of the scope of the present invention. Throughout the drawings, the same reference numerals will refer to the same or like parts.

Figure 1:
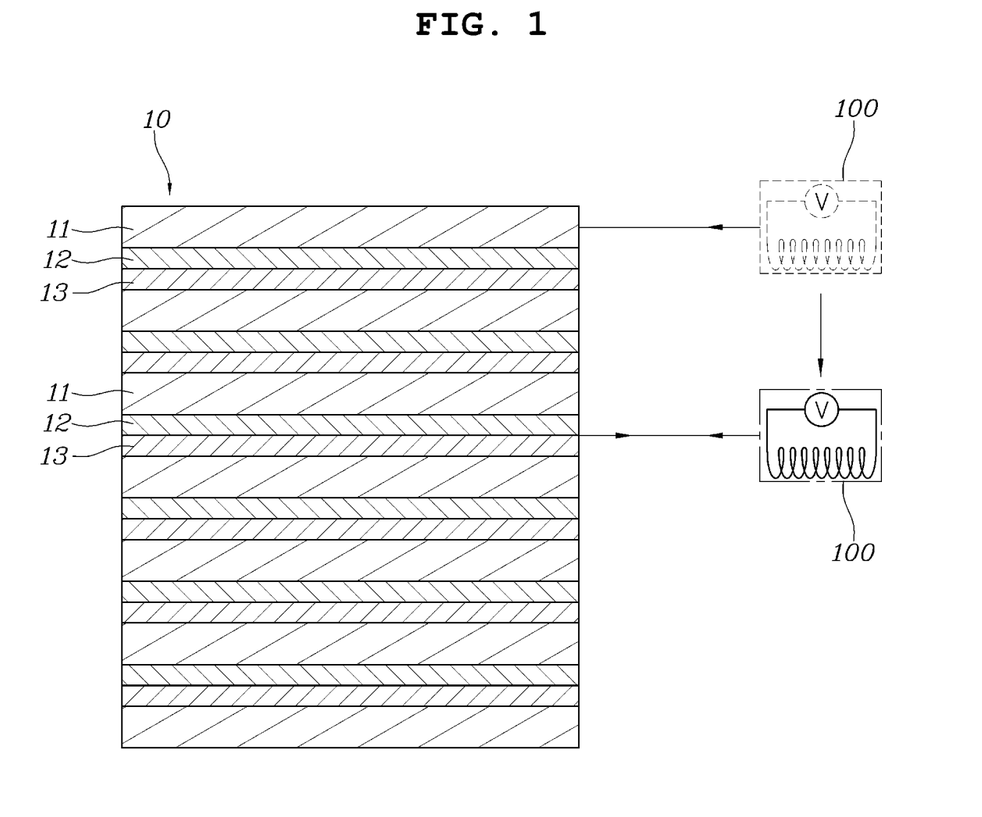
FIG. 1 is a view illustrating the principle of a method of measuring a cell pitch of a fuel cell stack according to a first embodiment of the present invention.

FIG. 1 is a view illustrating the principle of a method of measuring a cell pitch of a fuel cell stack according to a first embodiment of the present invention.

First, the principle of the method of measuring the cell pitch of the fuel cell stack according to the first embodiment of the present invention will be described.

As illustrated in FIG. 1, the fuel cell stack is configured by stacking an elastomeric cell frame 11 and a pair of separators 12 and 13 in multiple layers. At this time, the separators 12 and 13 are made of metal, and are configured such that when exposed to a magnetic field, a current is induced therein, and a reverse magnetic field is generated by the induced current.

Further, the elastomeric cell frame 11 is made of a thermoplastic elastomer (TPE) and is integrally formed with a membrane electrode assembly (MEA). In the elastomeric cell frame 11, no current is induced even when the elastomeric cell frame 11 is exposed to a magnetic field.

In this embodiment, the elastomeric cell frame 11 integrally formed with the MEA is described as an example, but the present invention is not limited thereto. For example, a resin frame made of resin and plastic and integrally formed with an MEA may be used. However, as in the case of the elastomeric cell frame 11, the resin frame should be made of a material in which no current is induced even when the resin frame is exposed to a magnetic field.

In addition, embodiments of the present invention may be applied to a cell structure in which an MEA is not integrally formed with an elastomeric cell frame, and a non-metal gasket is injection-molded to a metal separator.

Relative to the fuel cell stack 10 configured by stacking the metal separators 12 and 13 in which a current is induced upon exposure to a magnetic field and the elastomeric cell frame 11 in which no current is induced upon exposure to a magnetic field, as illustrated in FIG. 1, a detection unit 100 in which a magnetic field is generated in response to application of current is moved along a stacking direction.

The magnetic field generated by the detection unit 100 and oscillated in the direction of the fuel cell stack 10 has no reaction in the elastomeric cell frame 11 in a section passing through a side surface of the elastomeric cell frame 11, and then, in a section passing through sides surfaces of the separators 12 and 13, induces a current in the separators 12 and 13.

When the current is induced in the separators 12 and 13 in this way, a reverse magnetic field is generated in the separators 12 and 13 by the induced current. Therefore, the intensity of the magnetic field generated in the detection unit 100 is canceled by the reverse magnetic field generated in the separators 12 and 13, and accordingly, the intensity of the current detected by the detection unit 100 is changed.

When a point where the intensity of the current is changed occurs in the detection unit 100 in this way, it is determined that the separators 12 and 13 exist at the corresponding point.

To this end, it is preferable that the detection unit 100 is provided with a coil that generates a magnetic field in response to application of power, and an ammeter that measures a current value flowing through the coil.

Of course, the configuration of the detection unit 100 is not limited to the presented embodiment, and may be implemented in various ways capable of generating a magnetic field in response to application of power and measuring a changed current value.

The method of measuring the cell pitch of the fuel cell stack according to the embodiment of the present invention using the above principle is a method of measuring a unit cell pitch of the fuel cell stack 10 configured by stacking a plurality of unit cells each having the pair of metal separators 12 and 13 and the MEA interposed therebetween, and includes a preparation step of preparing the detection unit 100 that generates a magnetic field in response to application of power and measures a changed current value, a magnetic field oscillation step of oscillating, in the direction of the fuel cell stack 10, the magnetic field generated while the prepared detection unit boo is moved along a stacking direction of the unit cells, and a detection step of sensing an induced current generated in the separators 12 and 13 by the oscillated magnetic field to detect the positions of the separators 12 and 13.

The preparation step is a step of preparing the detection unit 100 capable of measuring the pitch of each unit cell using an electromagnetic induction method.

In detail, the detection unit 100 generates a magnetic field in response to application of power, and senses an induced current generated in the separators 12 and 13 by the generated magnetic field to detect the positions of the separators 12 and 13.

A measuring apparatus including the detection unit wo and a mover M for moving the detection unit wo will be described in detail later.

Meanwhile, the magnetic field oscillation step is a step of applying power to the detection unit 100 to generate a certain level of magnetic field to oscillate the magnetic field in the direction of the fuel cell stack 10, wherein the detection unit 100 is moved along the stacking direction of the unit cells.

At this time, the moving speed of the detection unit 100 is preferably maintained at a constant speed.

In addition, the movement path of the detection unit 100 may be set as the shortest path parallel to the stacking direction of the unit cells. By setting the path of the detection unit 100 as the shortest path in this way, the speed of measuring the positions of the separators 12 and 13 may be improved.

On the other hand, the movement path of the detection unit 100 may be set to be extended at an incline so that the detection unit 100 is moved at a predetermined angle along the stacking direction of the unit cells. By setting the path of the detection unit 100 to be extended in this way, the accuracy of measuring the positions of the separators 12 and 13 may be improved.

The detection step is a step of sensing the induced current generated in the separators 12 and 13 by the magnetic field oscillated by the detection unit 100, and detecting the positions of the separators 12 and 13 using the detected induced current.

In detail, as illustrated in FIG. 1, when a current is induced in the separators 12 and 13 by the magnetic field oscillated by the detection unit 100, a reverse magnetic field is generated in the separators 12 and 13 by the induced current. Therefore, the intensity of the magnetic field generated in the detection unit 100 is canceled by the reverse magnetic field generated in the separators 12 and 13, and accordingly, the intensity of the current detected by the detection unit 100 is changed. When a point where the intensity of the current is changed occurs in the detection unit 100 in this way, it is determined that the separators 12 and 13 exist at the corresponding point.

Thus, after sequentially detecting the positions at which the separators 12 and 13 are sensed, the distance between the positions at which the separators 12 and 13 are sensed is determined as the pitch of a unit cell.

Next, a measuring apparatus for implementing the method of measuring the cell pitch of the fuel cell stack as described above will be described.

Figure 2:
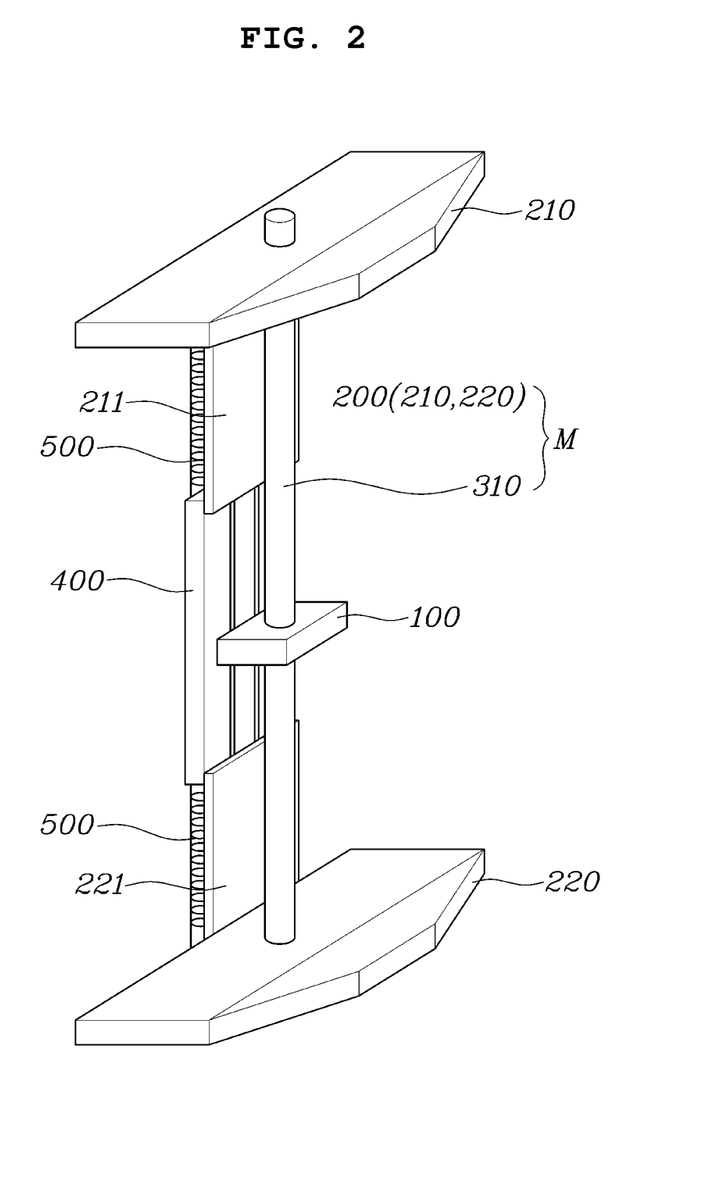
FIG. 2 is a view illustrating an apparatus for measuring a cell pitch of a fuel cell stack according to a second embodiment of the present invention.
Figure 3:
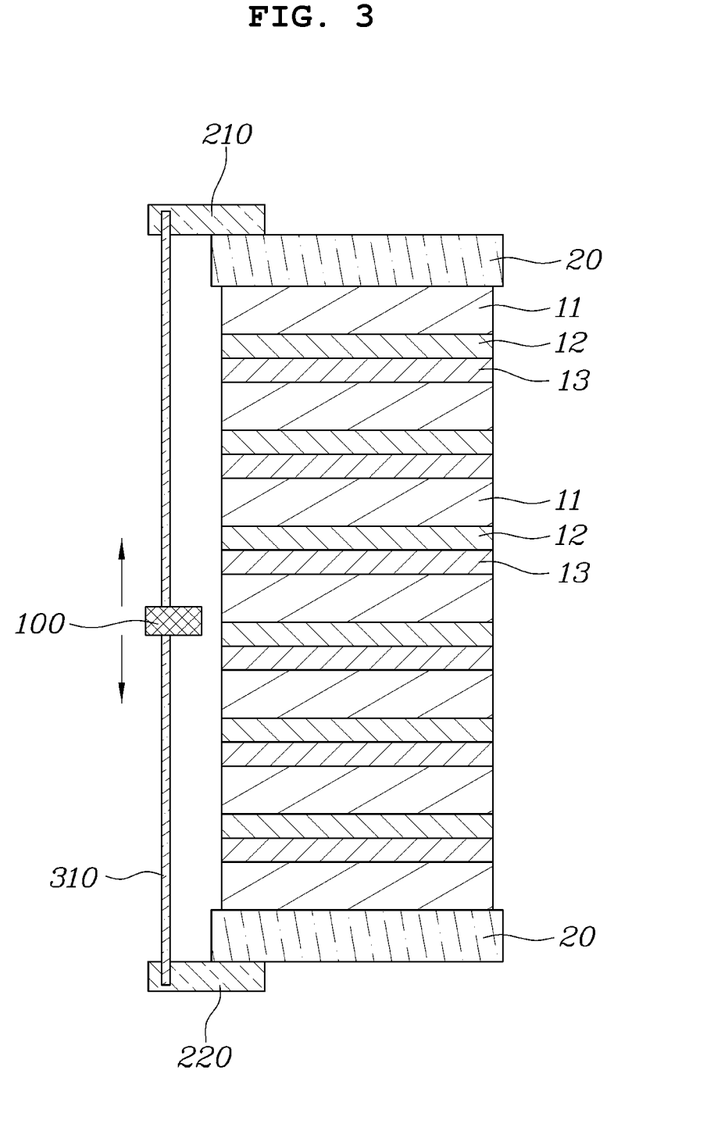
FIG. 3 is a view illustrating an operating state of the apparatus of measuring the cell pitch of the fuel cell stack according to the second embodiment of the present invention.

FIG. 2 is a view illustrating an apparatus for measuring a cell pitch of a fuel cell stack according to a second embodiment of the present invention, and FIG. 3 is a view illustrating an operating state of the apparatus of measuring the cell pitch of the fuel cell stack according to the second embodiment of the present invention.

As illustrated in FIGS. 2 and 3, the apparatus for measuring the cell pitch of the fuel cell stack 10 according to the second embodiment of the present invention includes a detection unit 100 for generating a magnetic field in response to application of current while being moved along a stacking direction of unit cells, and sensing an induced current generated in metal separators 12 and 13 by the magnetic field to detect the positions of the separators 12 and 13.

At this time, the detection unit 100 includes a magnetic field generator for generating a magnetic field in response to application of power and an induced current detector for detecting an induced current generated in the metal separators 12 and 13 by the magnetic field generated by the magnetic field generator.

Therefore, when the induced current is generated in the separators by the magnetic field oscillated by the magnetic field generator and a reverse magnetic field is generated thereby, the induced current detector detects a change in the intensity of the current changed by the reverse magnetic field to thereby determine the positions of the separators.

In addition, a mover M for moving the detection unit 100 at a constant speed along the stacking direction of the fuel cell stack 10 is provided.

The path of the detection unit 100 may be set as the shortest path where the detection unit 100 is moved along the stacking direction of the unit cells.

For example, the mover M for moving the detection unit 100 may include a support 200 composed of an upper support 210 supported on an upper end of the fuel cell stack 10 and a lower support 220 supported on a lower end of the fuel cell stack 10, and a vertical guide bar 310 installed between the upper support 210 and the lower support 220 along the stacking direction of the unit cells.

Thus, the detection unit 100 is moved along the vertical guide bar 310.

At this time, the vertical guide bar 310 is preferably installed in the shortest path between the lower support 220 and the upper support 210.

The upper support 210 and the lower support 220 are fixed outside of end plates 20 of the fuel cell stack 10. In addition, in order to fix the upper support 210 and the lower support 220 to the end plates 20 in response to fuel cell stacks 10 of various lengths, a distance adjusting means for adjusting the distance between the upper support 210 and the lower support 220 is provided.

For example, the distance adjusting means for adjusting the distance between the upper support 210 and the lower support 220 may include a rail block 400 provided between the upper support 210 and the lower support 220, an upper slide 211 coupled to the upper support 210 to slide integrally with the upper support 210 along the rail block 400, a lower slide 221 coupled to the lower support 220 to slide integrally with the lower support 220 along the rail block 400, and an elastic member 500 provided between the rail block 400 and each of the upper support 210 and the lower support 220 to provide a restoring force to bias the upper support 210 and the lower support 220 in directions toward the rail block 400.

In this case, a rail groove may be formed in a surface of the rail block 400 so that the upper slide 211 and the lower slide 221 slide along the rail groove.

Meanwhile, in embodiments of the present invention, in order to reduce an error in detecting the positions of the separators 12 and 13 through the detection unit 100, the movement path of the detection unit 100 may be extended.

Figure 4:
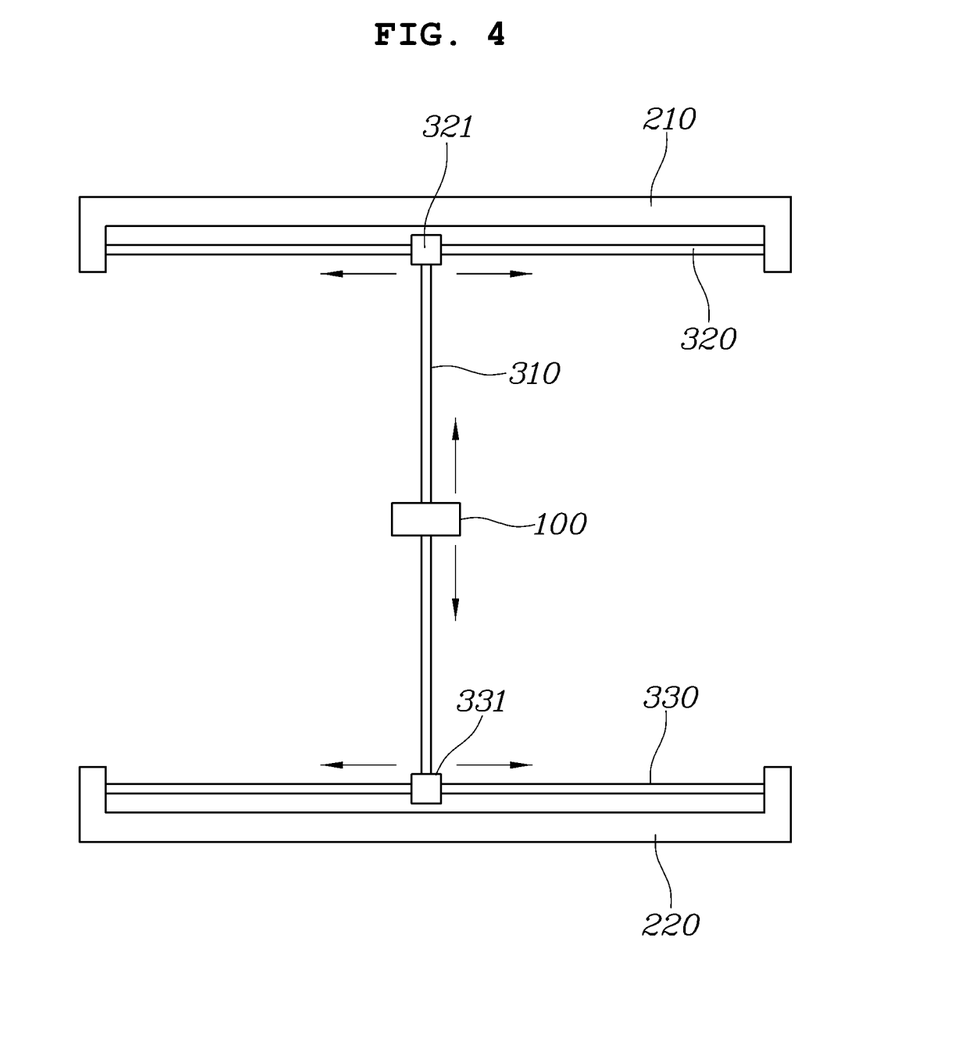
FIG. 4 is a view illustrating an apparatus for measuring a cell pitch of a fuel cell stack according to a third embodiment of the present invention.
Figure 5:
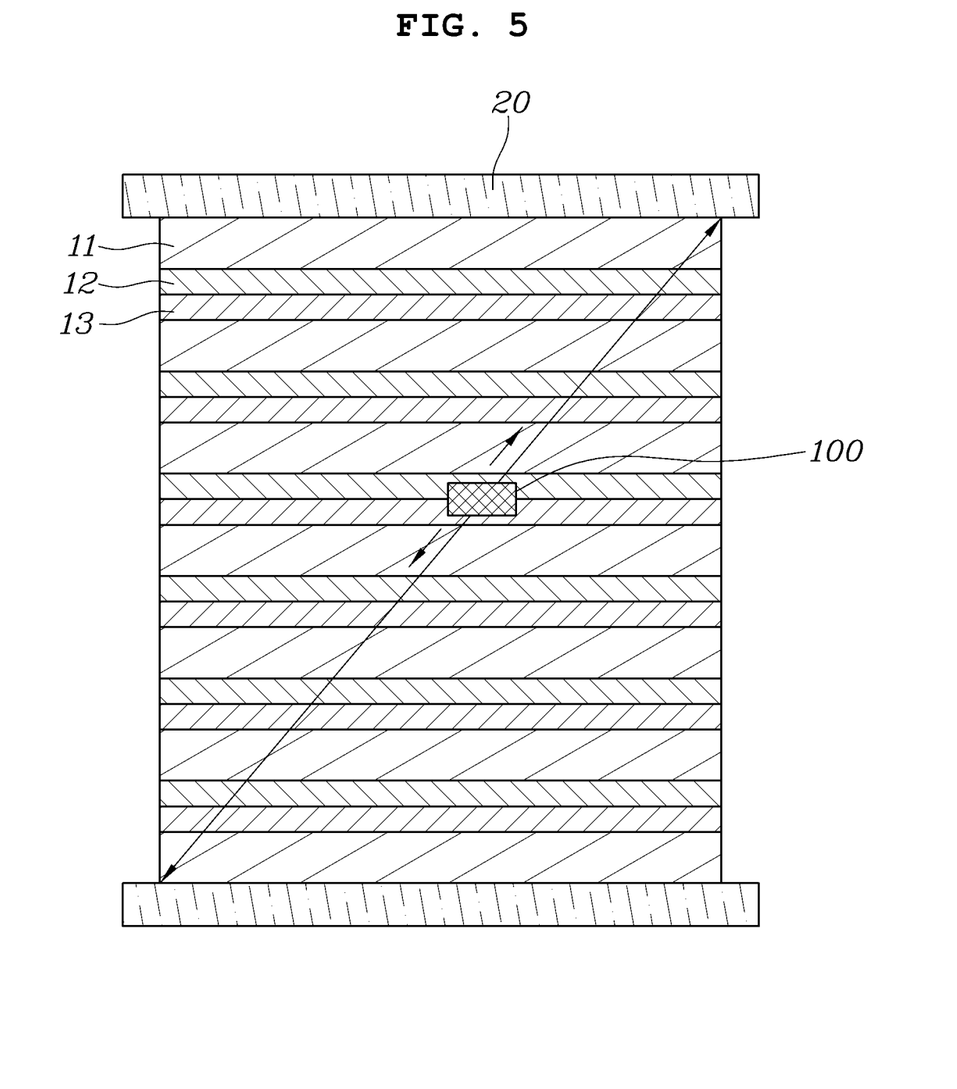
FIG. 5 is a view illustrating an operating state of the apparatus of measuring the cell pitch of the fuel cell stack according to the third embodiment of the present invention.

FIG. 4 is a view illustrating an apparatus for measuring a cell pitch of a fuel cell stack according to a third embodiment of the present invention, and FIG. 5 is a view illustrating an operating state of the apparatus of measuring the cell pitch of the fuel cell stack according to the third embodiment of the present invention.

As illustrated in FIGS. 4 and 5, in the apparatus for measuring the cell pitch of the fuel cell stack 10 according to the third embodiment of the present invention, the movement path of a detection unit 100 may be set to be extended at an incline so that the detection unit 100 is moved at a predetermined angle along a stacking direction of unit cells.

For example, as in the case of the previous embodiment, a mover M for moving the detection unit 100 may include a support 200 composed of an upper support 210 supported on an upper end of the fuel cell stack 10 and a lower support 220 supported on a lower end of the fuel cell stack 10, and a vertical guide bar 310 installed between the upper support 210 and the lower support 220 along the stacking direction of the unit cells.

In addition, the mover M may further include an upper horizontal guide bar 320 having opposite ends installed at opposite ends of the upper support 210, an upper moving block 321 coupled to an upper end of the vertical guide bar 310 to be moved in a horizontal direction along the upper horizontal guide bar 320, a lower horizontal guide bar 330 having opposite ends installed at opposite ends of the lower support 220, and a lower moving block 331 coupled to a lower end of the vertical guide bar 310 to be moved in the horizontal direction along the lower horizontal guide bar 330.

Thus, the vertical guide bar 310 is moved in the horizontal direction along the upper horizontal guide bar 320 and the lower horizontal guide bar 330. While the vertical guide bar 310 is moved in the horizontal direction, the detection unit 100 is moved in a vertical direction along the vertical guide bar 310.

By this operation, as illustrated in FIG. 5, the detection unit 100 is moved at a predetermined angle in an inclined vertical direction in a side region of the fuel cell stack 10.

Accordingly, through the apparatus with such configuration, the detection unit 100 may be freely moved in the side region of the fuel cell stack 10.

By extending the movement path of the detection unit 100 in this way to extend the path passing through side portions the separators 12 and 13, the accuracy of detecting the positions of the separators 12 and 13 may be improved.

Meanwhile, the moving mechanism for the detection unit 100, the upper moving block 321, and the lower moving block 331 suggested in the above-described embodiments are not limited to a specific mechanism, and may be implemented using various mechanisms. For example, the moving mechanism may be implemented in a rack and pinion mechanism or a linear motion (LM) guide mechanism.

Although the exemplary embodiments have been described in the detailed description of the present invention, the scope of the present invention should not be limited to the described embodiments, but should be determined by the accompanying claims and equivalents thereof. Therefore, those skilled in the art will appreciate that various modifications, additions, and substitutions are possible, without departing from the scope and spirit of the invention as disclosed in the accompanying claims.

What is claimed is:

1. An apparatus comprising: a detector configured to:
   generate a magnetic field;
   sense an induced current generated in metal separators of a fuel cell stack by the generated magnetic field, wherein the fuel cell stack comprises a plurality of unit cells stacked in a stacking direction, and wherein each unit cell has a membrane electrode assembly interposed between a pair of metal separators; and
   detect positions of the metal separators in the fuel cell stack based on the sensed induced current; and
   a mover configured to maintain a moving speed of the detector at a constant speed, the mover comprising:
   a support comprising an upper support supported on an upper end of the fuel cell stack and a lower support supported on a lower end of the fuel cell stack;
   a vertical guide bar installed between the upper support and the lower support along the stacking direction of the plurality of unit cells;
   a rail block arranged between the upper support and the lower support;
   an upper slide coupled to the upper support and configured to slide integrally with the upper support along the rail block;
   a lower slide coupled to the lower support and configured to slide integrally with the lower support along the rail block; and
   an elastic member arranged between the rail block and each of the upper support and the lower support to provide a restoring force to bias the upper support and the lower support in directions toward the rail block,
   wherein the apparatus is configured to measure a cell pitch of a unit cell of the plurality of unit cells based on the detected positions of the metal separators.

2. The apparatus of claim 1, wherein the detector is configured to move along the vertical guide bar.

3. The apparatus of claim 1, wherein the detector comprises:
   a magnetic field generator configured to generate the magnetic field in response to application of power; and
   a current detector configured to detect the induced current generated in the metal separators by the magnetic field generated by the magnetic field generator.

4. The apparatus of claim 3, wherein the magnetic field generator is configured to provide an oscillating magnetic field such that a current is induced in the metal separators, which current provides a reverse magnetic field, and wherein the current detector is configured to detect a change in intensity of the induced current based on the reverse magnetic field.

5. A method comprising:
   generating a magnetic field;
   moving, by a mover, the magnetic field along a stacking direction of a fuel cell stack, wherein the fuel cell stack comprises a plurality of unit cells stacked in the stacking direction, and wherein each unit cell has a membrane electrode assembly interposed between a pair of metal separators;

detecting, by a detector, an induced current generated in metal separators by a generated magnetic field;

detecting, by the detector, positions of the metal separators based on the induced current; and measuring a cell pitch of a unit cell of the plurality of unit cells based on the detected position of the metal separators, wherein the detector is moved with a constant speed, and wherein the mover comprises:

a support comprising an upper support supported on an upper end of the fuel cell stack and a lower support supported on a lower end of the fuel cell stack, a vertical guide bar installed between the upper support and the lower support along the stacking direction of the plurality of unit cells, a rail block arranged between the upper support and the lower support, an upper slide coupled to the upper support and integrally slidable with the upper support along the rail block, a lower slide coupled to the lower support and integrally slidable with the lower support along the rail block, and an elastic member arranged between the rail block and each of the upper support and the lower support to provide a restoring force to bias the upper support and the lower support in directions toward the rail block.

6. The method of claim 5, further comprising generating and oscillating, by the detector, the magnetic field, wherein sensing comprises sensing the induced current generated in the metal separators by the oscillating magnetic field.

7. The method of claim 6, further comprising maintaining a moving speed of the detector when oscillating the magnetic field.

8. The method of claim 6, wherein detecting the positions comprises detecting a change in intensity of the induced current changed by a reverse magnetic field generated when the induced current is generated in the metal separators by the oscillating magnetic field.

9. The method of claim 5, wherein generating the magnetic field and detecting positions of the metal separators are performed using the detector that comprises a magnetic field generator and a current detector.

10. An apparatus comprising:
a detector configured to:
generate a magnetic field;
sense an induced current generated in metal separators of a fuel cell stack by the generated magnetic field, wherein the fuel cell stack comprises a plurality of unit cells stacked in a stacking direction, and wherein each unit cell has a membrane electrode assembly interposed between a pair of metal separators; and
detect positions of the metal separators in the fuel cell stack based on the sensed induced current; and
a mover configured to maintain a moving speed of the detector at a constant speed, the mover comprising:
a support comprising an upper support supported on an upper end of the fuel cell stack and a lower support supported on a lower end of the fuel cell stack;
a vertical guide bar installed between the upper support and the lower support along the stacking direction of the plurality of unit cells;
an upper horizontal guide bar having opposite ends installed at opposite ends of the upper support;
an upper moving block coupled to an upper end of the vertical guide bar and configured to be moved in a horizontal direction along the upper horizontal guide bar;
a lower horizontal guide bar having opposite ends installed at opposite ends of the lower support; and a lower moving block coupled to a lower end of the vertical guide bar and configured to be moved in the horizontal direction along the lower horizontal guide bar,
wherein the apparatus is configured to measure a cell pitch of a unit cell of the plurality of unit cells based on the detected positions of the metal separators.

11. The apparatus of claim 10, wherein the detector is configured to move along the vertical guide bar.

12. The apparatus of claim 10, wherein the detector comprises:
a magnetic field generator configured to generate the magnetic field in response to application of power, and
a current detector configured to detect the induced current generated in the metal separators by the magnetic field generated by the magnetic field generator.

13. The apparatus of claim 12, wherein the magnetic field generator is configured to provide an oscillating magnetic field such that a current is induced in the metal separators, which current provides a reverse magnetic field, and wherein the current detector is configured to detect a change in intensity of the induced current based on the reverse magnetic field.

* * * * *